United States Patent [19]

Fattouche

[11] Patent Number: 5,127,024
[45] Date of Patent: Jun. 30, 1992

[54] CONVERSION FILTERING FOR DIGITAL SIGNALING SYSTEMS

[76] Inventor: Michel T. Fattouche, 156 Hawkwood Blvd N.W., Calgary, T3G 2T2, Canada

[21] Appl. No.: 530,579

[22] Filed: May 30, 1990

[51] Int. Cl.$^5$ .................... H04L 27/04; H04L 27/12; H04L 27/20
[52] U.S. Cl. .................................. 375/59; 375/60; 371/43; 332/107
[58] Field of Search .................. 375/18, 37, 39, 59, 375/60; 371/30, 43; 332/107, 160; 455/39, 43

[56] References Cited

U.S. PATENT DOCUMENTS

| | | | |
|---|---|---|---|
| 4,229,821 | 10/1980 | de Jagor et al. | 375/53 |
| 4,358,853 | 11/1982 | Qureshi | 375/39 |
| 4,426,710 | 1/1984 | Pommier | 375/64 |
| 4,438,413 | 3/1984 | Ryan | 375/64 |
| 4,445,094 | 4/1984 | Ryan | 375/90 |
| 4,583,236 | 4/1986 | Kromer et al. | 375/20 |
| 4,586,182 | 4/1986 | Gallager | 375/25 |
| 4,686,688 | 8/1987 | Chung et al. | 375/64 |

Primary Examiner—Benedict V. Safourek
Assistant Examiner—Young Tse
Attorney, Agent, or Firm—Anthony R. Lambert

[57] ABSTRACT

One way to increase the bandwidth efficiency of a linear modulation scheme is to increase the number M of possible signaling levels. Such an increase is achieved however at the expense of a smaller minimum distance $d_{min}$ between the multilevels, for a fixed average signal power. The present invention involves the use of a conversion filter as part of a digital signaling system used over a communications channel of limited bandwidth and power. A conventional linear digital signaling system consists of an encoder, a shaping filter, a modulator and a bandpass filter. In the present invention, the digital signaling system consists of an encoder, a conversion filter, a modulator and a passband filter. The conventional filter increase the bandwidth efficiency of the scheme when its impulse response spreads over L signaling intervals. Such an increase is achieved however, at the expenses of a smaller $d_{min}$. By increasing the modulation index h of the conversion filter, it is possible to increase $d_{min}$. The invention also provides steps for choosing the modulation index h, the cutoff frequency $f_{oo}$ of the bandpass filter and the spread L of the conversion filter such that $d_{min}$ is locally maximized for a fixed bandwidth efficiency and a fixed complexity of the receiver.

10 Claims, 2 Drawing Sheets

CONVERSION FILTERING FOR DIGITAL SIGNALING SYSTEMS

BACKGROUND OF THE INVENTION

This invention relates to the processing of digital data for transmission over a communications channel of limited bandwidth and power, and relates to a method and apparatus for increasing the bandwidth efficiency and the power efficiency of the transmission.

One way to increase the bandwidth efficiency of a linear modulation scheme is to increase the number M of possible signaling levels. Such an increase is achieved however at the expenses of a smaller minimum distance $d_{min}$ between the multilevels, for a fixed average signal power.

Csajka et al (U.S. Pat. No. 4,077,021) describe Trellis Coded Modulation (TCM) which combines convolutional coding with linear multilevel modulation schemes in an efficient way. TCM preserves the Bandwidth (BW) efficiency of the modulation schemes while offering 3 to 6 db increase in $d_{min}^2$ over multilevel modulation, and is considered the state of the art in the domain of power and Bandwidth (BW) efficient modulation schemes.

The present invention involves the use of a conversion filter and a bandpass filter (BPF) together with an encoder and a modulator as part of a digital signaling system. The difference between the signaling system involved in the present invention and the signaling system comprising TCM is the conversion filter which allows the signaling system to generate schemes that are more BW-efficient than the schemes generated by the encoder-modulator combination. It can be shown that the digital signaling system described in the present invention can generate schemes that have larger $d_{min}^2/E_b$ than TCM for comparable BW-efficiency and comparable complexity of the receiver, $E_b$ being the average energy per transmitted bit.

Conversion filtering was first introduced in 1969 by Lender (Canadian Patent No. 823,307,2) in order to generate a signal of near constant envelope. In Lender, the conversion filter is an Infinite Impulse Response (IIR) filter, constrained to have a specific Power Spectral Density (PSD) and a modulation index h equal to $\frac{1}{2}$. Subsequently, conversion filtering was used to generate signals of constant envelope (A. R. Hambley and O. Tanaka, "Generalized Serial MSK Modulation," IEEE Trans. on Commun., Vol. COM-32, pp. 305–308, March 1984 and F. Amoroso and J. A. Kivett, "Simplified MSK Signaling Technique," IEEE Trans. Commun., Vol. COM-25, pp. 433–441, April 1977). In both cases, the conversion filter is a Finite Impulse Response (FIR) filter, constrained to have a length equal to one symbol duration, a modulation index h equal to $\frac{1}{2}$ and whose Lowpass (LP) equivalent Impulse Response (IR) $\tilde{g}(t)$ is restricted to take the format $$\tilde{g}(t)' = -j \frac{\partial \phi(t)}{\partial t} e^{j\phi(t)}$$

where $\phi(t)$ is a slowly varying function and $j = \sqrt{-1}$.

SUMMARY OF THE INVENTION

In one aspect, the present invention provides an apparatus for transmitting a digital signal over a communications channel, the apparatus comprising:

at least one encoder for converting digital signals into a sequence of symbols;

a conversion filter electrically connected to the encoder and having an impulse response with a spread L and a modulation index h, for filtering the sequence of symbols to generate a signal S;

a modulator electrically connected to the conversion filter for modulating the signal S to generate a signal V;

a bandpass filter electrically connected to the modulator and having a cut-off frequency $f_{co}$ for filtering the signal V to generate a signal R;

the spread L, the cut-off frequency $f_{co}$ and the modulation index h being chosen so that the power efficiency is locally maximized for a fixed bandwidth efficiency.

In another aspect, the present invention provides a process for transmitting a digital signal over a communications channel, the process comprising:

encoding the digital signals to generate a sequence of symbols;

filtering the sequence of symbols with a conversion filter to generate a signal S, the conversion filter having an impulse response with spread L and a modulation index h;

modulating the signal S with a modulator to generate a signal V;

filtering the signal V with a bandpass filter to generate a signal R, the bandpass filter having a cut-off frequency $f_{co}$;

the spread L, the cut-off frequency $f_{co}$ and the modulation index h being chosen so that the power efficiency is locally maximized for a fixed bandwidth efficiency.

A further summary of the invention is found in the claims appended to this Patent.

BRIEF DESCRIPTION OF THE DRAWINGS

There will now be described the manner of operation of the invention and preferred embodiments of the invention, with reference to FIG. 1, which is a block diagram of the 4 processing stages of the digital signaling system according according to the invention.

DESCRIPTION OF THE INVENTION

Figure 1:
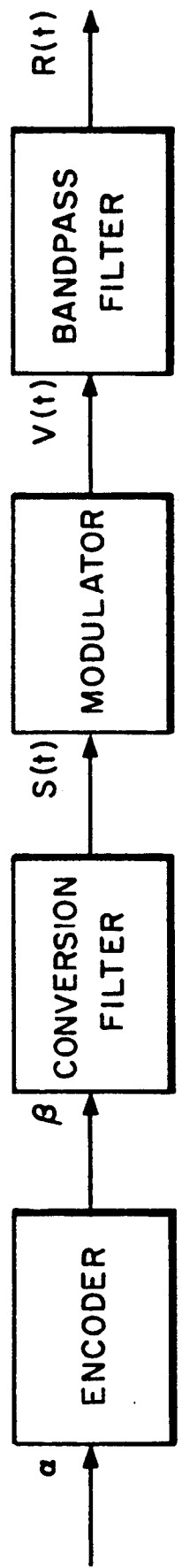

The present invention involves a digital signaling system which comprises an encoder, a conversion filter, a modulator and a BPF as shown in FIG. 1. The encoder receives a sequence $\alpha$ of bits intended for transmission and generates a sequence $\beta$ of symbols. The sequence $\alpha$ consists of the bits . . . , $\alpha_i$, $\alpha_{i-1}$, . . . which take one of the two values $\pm 1$ and the sequence $\beta$ consists of the symbols . . . , $\beta_i$, $\beta_{i-1}$, . . . , where i is an integer taken from $\{\ldots, -1, 0, 1, \ldots\}$. Possible encoders in FIG. 1 are: precoders, channel encoders and source encoders, or any combination thereof. In the present invention, precoders are used essentially to prevent error propagation, channel encoders are used essentially to achieve a gain in $d_{min}^2$ and source encoders are used essentially to achieve a gain in the BW efficiency. Examples of precoders are differential encoders where $\beta_i = (\alpha_i + \beta_{i-1}) \text{modulo-M}$. Examples of channel encoders are block encoders and convolutional encoders (see J. G. Proakis, "Digital Communications," McGraw-Hill, New York, 1983).

Examples of source encoders are M-ary mappers followed by a Gray encoder where the real part of $\beta_i$ takes one of the M values $\{\pm 1, \pm 3, \ldots \pm(M-1)\}$ (assuming M even) and where the imaginary part of $\beta_i$ takes either the value 0 or one of the M values $\{\pm 1, \pm 3, \ldots, \pm(M-1)\}$. When the imaginary part of $\beta_i$ takes only the value zero, $\beta_i$ is said to be real. When the imaginary part of $\beta_i$ takes one of the M values $\{\pm 1, \pm 3, \ldots, \pm(M-1)\}$ $\beta_i$ is said to be complex.

Figure 2:
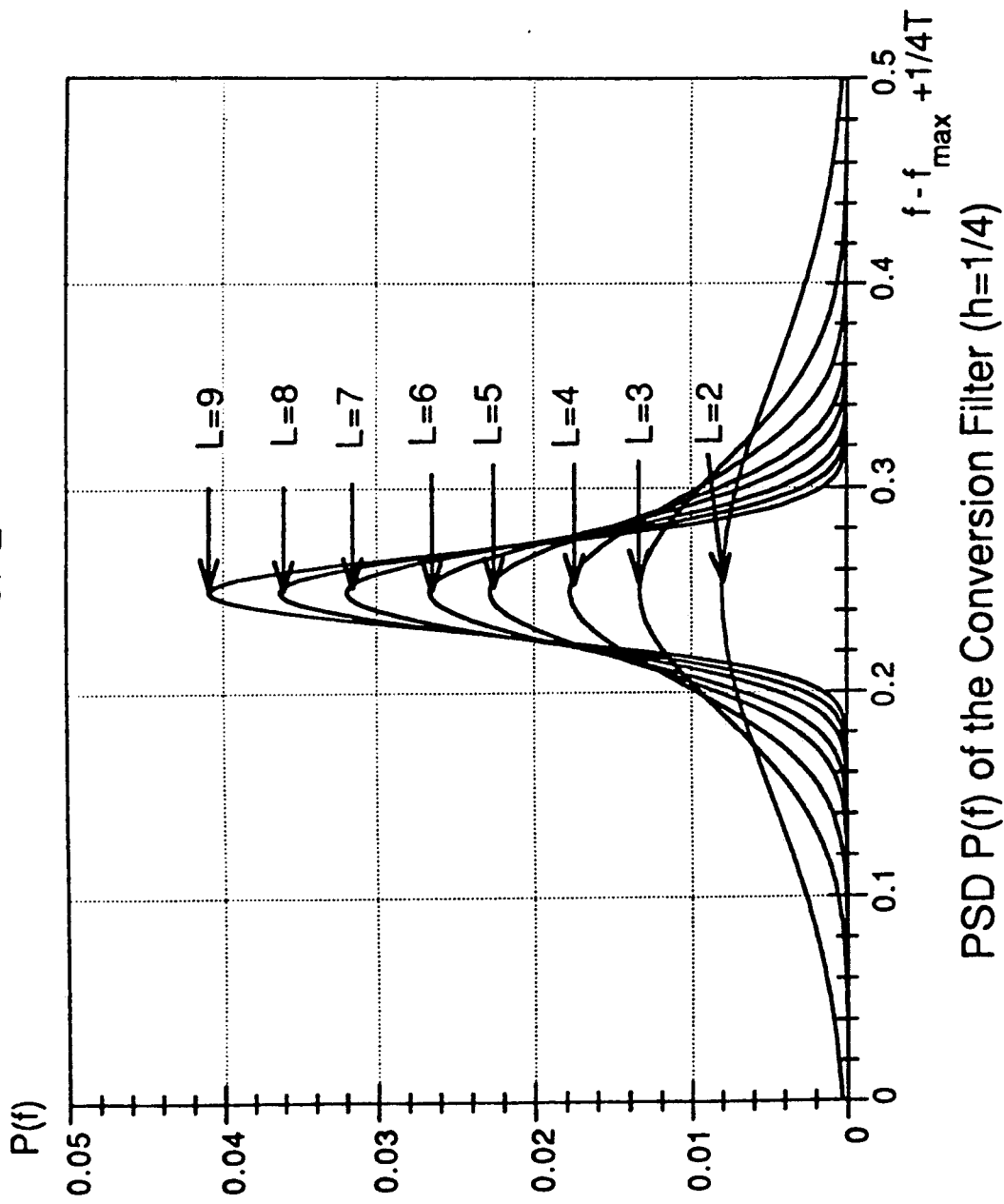
FIG. 2 shows a graph of power spectral density of a conversion filter with Gaussian impulse response for utilization in accordance with the invention.

In FIG. 1, the conversion filter receives the sequence $\beta$ and generates the signal S'(t) which is a function of time "t" and of the sequence $\beta$. The signal S'(t) is defined $$S'(t) = \sum_i \beta_i \bar{g}(t - iT)$$

where T is the signaling interval which corresponds to the duration of one symbol and $\bar{g}(t)$ is the lowpass equivalent impulse response of the conversion filter. The preferred shape for $\bar{g}(t)$ is a Gaussian function of time defined as $$\bar{g}(t) = (4\pi\sigma^2)^{\frac{1}{4}} e^{-2(\pi\sigma)^2 t^2} e^{j2\pi h t/T}$$

where h is the modulation index which determines the frequency by which the conversion filter is offset from dc (i.e. from the zero frequency) and $\sigma$ is inversely proportional to the spread L. FIG. 2 shows power spectral density of the conversion filter for various choices of L. The spread L is defined as the number of signaling intervals over which $\bar{g}(t)$ spreads in a significant manner, i.e. in a manner where $\bar{g}(t)$ is smaller than essentially about $10^{-2}$ for t larger than LT.

While a preferred manner of applying the conversion has been described, any alternate conversion filter having the following preferred complex autocorrelation: "$e^{(-\pi\sigma)^2} e^{j2\pi h t/T}$", can be used to generate S'(t).

See attached software for a display of the conversion filtering process. The software consists of a computer simulation of the encoder (noprecod.f), of the conversion filter (Gaus WMF.f), of the modulator and of the bandpass filter (channel WMF.f) according to the above preferred specifications. The communications channel is an Additive White Gaussian Noise channel.

In FIG. 1, the modulator receives the signal S'(t) and generates the signal S(t) defined as $$V(t) = Re\{S'(t) e^{j2\pi f_c t}\}$$

where $f_c$ is the carrier frequency assumed to be much greater than 1/T and "Re$\{\alpha\}$" denotes the real part of "$\alpha$". In other words, S'(t) is the complex envelope of S(t).

Finally, in FIG. 1, the BPF receives the signal V(t) and generates the signal R(t) which is ready to undergo amplification and transmission over a communications channel. The amplification is assumed linear, otherwise, the conversion filter will have to be predistorted in order to compensate for distortion inflicted on R(t) due to nonlinear amplification. The BPF has a nonzero flat response over the frequency range $[f_{max}-f_{co}, f_{max}+f_{co}]$ where $f_{max}$ corresponds to the positive frequency and a zero response elsewhere the power spectral density of S(t) reaches its maximum and $f_{co}$ is the cutoff frequency of the BPF.

EXPLANATION OF THE INVENTION

The following explanation is in relation to the digital signaling system in FIG. 1. By increasing the spread L of the impulse response of the conversion filter, the Power Spectral Density (PSD) of the signal S'(t), which is defined as:

$$\text{``} \frac{1}{\sqrt{\pi\sigma}} e^{-\left(\frac{f-h/T}{\sigma}\right)^2} \text{''}$$

is reduced (assuming that $\beta$ consists of equiprobable symbols). In other words, by increasing L, the bandwidth efficiency is increased compared to a conventional linear digital signaling system which uses a shaping filter satisfying Nyquist criterion. The power spectral density of S'(t) corresponds to the complex autocorrelation.

By increasing the spread L of the conversion filter however, memory is added into S'(t). In other words, the amount of Intersymbol Interference (ISI) that exists in S'(t) is directly proportional to L. Such an ISI can in turn decrease the value of $d_{min}^2/E_b$ below the value 4.0 which corresponds to the maximum value of $d_{min}^2/E_b$ a conventional linear digital signaling system can reach. Nontheless, ranges of the modulation index h of the conversion filter exist where $d_{min}^2/E_b$ is increased by varying h.

Finally, S(t) is not necessarily bandlimited. To bandlimit S(t), it must be filtered using a bandpass filter as shown in FIG. 1. In this case, the bandpass filter has to be centered in the frequency domain around $f_{max}$ and frequency $f_{co}$ has to be chosen large enough to pass essentially about 90% or more of the average power in the signal S(t).

The present invention describes a transmission process and apparatus which is, of course, only one end of the transmitter/receiver pair. Receivers that would have practical utility with the present invention are well known in the art, as described, for example, in J. G. Proakis "Digital Communications," McGraw-Hill, New York, 1983, and would include the following parts: a coherent demodulator, followed by a filter matched to "$\bar{g}(t)$", possibly an equalizer to remove part of the ISI introduced by the BPF and the channel, and finally a Viterbi Algorithm (VA). However, suboptimal receives can also be used at the expenses of a poorer performance of the receiver. Examples of suboptimal receivers are (as described in the last mentioned reference) non-coherent receivers (such as differential detectors or frequency discriminators to be used when coherent detection is not possible) and symbol-by-symbol receivers (such as Linear Mean Square Equalizers or Decision Feedback Equalizers to be used when low complexity receivers are desirable).

A preferred receiver would consist of a coherent demodulator, followed by a filter matched to "$\bar{g}(t)$" and a Viterbi Algorithm (VA). The VA would preferably have the following complexity: "$M^L$" states/2-Dimensions if $\beta$ consists of real symbols and "$M^{2L}$" states/2-Dimensions if $\beta$ consists of complex symbols. A VA with a smaller number of states can also be used at the expenses of a poorer performance of the receiver.

See attached software for a display of the preferred Viterbi Algorithm. The software consists of a computer simulation of the coherent receiver consisting of a matched filter and a VA (VitAlg.f, vitmin.f, vitmin Q.f, vitdecod.f, vitdecodQ.f) according to the above preferred specifications of the bandpass filter (channel WMF.f) over an Additive White Gaussian Noise channel.

With a given encoder and modulator, the various parameters of the conversion filter and of the bandpass filter may be chosen as follows:

1. The spread L of the conversion filter is chosen according to the desired BW efficiency with $f_{co}$ chosen such that about 90% or more of the average power in the signal S(t) output from the conversion filter is allowed through the BPF.

2. The modulation index h is chosen according to L such that $d_{min}^2/E_b$ reaches a local maximum. One has to realize that by fixing the bandwidth efficiency, L is fixed and consequently, the complexity of the preferred VA is also fixed.

EXAMPLES OF THE PREFERRED PARAMETERS

The following examples demonstrate the preferred values for the parameters L, $\sigma$, h and $f_{co}$ according to the steps mentioned in the previous section, together with the corresponding $d_{min}^2/E_b$ and BW efficiency. When a Viterbi Algorithm (VA) is used in the receiver, its preferred number of states/2 Dimensions is also shown in the following examples.

EXAMPLE I

The encoder consists of an M-ary mapper where $\beta$ is a sequence of real symbols that take one of the M values: $\{\pm 1, \pm 3, \ldots, \pm(M-1)\}$, followed by a Gray encoder. Table I summarizes the preferred values of $\sigma$ and $f_{co}$ for $L = 2, \ldots, 9$, $h = \frac{1}{4}$ and $M = 2$ and 4, together with the corresponding $d_{min}^2/E_b$, BW efficiency and the number of states required in a VA.

TABLE I

| M | L | $\sigma$T | $f_{co}$T | $d_{min}^2/E_b$ | BW efficiency bits/s/Hz | # of VA states/2D |
|---|---|---|---|---|---|---|
| 2 | 2 | 0.200 | 0.500 | 4.00 | 1.0 | 2 |
| 2 | 3 | 0.120 | 0.277 | 2.70 | 1.8 | 4 |
| 2 | 4 | 0.090 | 0.208 | 1.82 | 2.4 | 8 |
| 2 | 5 | 0.070 | 0.166 | 1.22 | 3.0 | 16 |
| 2 | 6 | 0.060 | 0.139 | 0.82 | 3.6 | 32 |
| 2 | 7 | 0.050 | 0.116 | 0.56 | 4.3 | 64 |

TABLE I-continued

| M | L | $\sigma$T | $f_{co}$T | $d_{min}^2/E_b$ | BW efficiency bits/s/Hz | # of VA states/2D |
|---|---|---|---|---|---|---|
| 2 | 8 | 0.044 | 0.102 | 0.38 | 4.9 | 128 |
| 2 | 9 | 0.039 | 0.091 | 0.25 | 5.5 | 256 |
| 4 | 2 | 0.200 | 0.500 | 1.60 | 2.0 | 4 |
| 4 | 3 | 0.120 | 0.277 | 1.08 | 3.6 | 16 |
| 4 | 4 | 0.090 | 0.208 | 0.73 | 4.8 | 64 |
| 4 | 5 | 0.070 | 0.166 | 0.25 | 6.0 | 256 |

One should notice that for Binary Phase Shift Keying, $d_{min}^2/E_b$ is equal to 4.0 which represents the maximum value $d_{min}^2/E_b$ can reach for a linear modulation scheme.

EXAMPLE II

Once again, the encoder consists of an M-ary mapper and a Gray encoder. In this case however, $\beta$ consists of complex symbols (i.e. the imaginary part of $\beta_i$ takes one of the M values: $\{\pm 1, \pm 3, \ldots, \pm(M-1)\}$). Table II summarizes the preferred values of $\sigma$ and $f_{co}$ for $L = 2, \ldots, 5$, $h = \frac{1}{4}$ and $M = 2$ and 4, together with the corresponding $d_{min}^2/2E_b$, the BW efficiency and the number of states required in a VA.

TABLE II

| M | L | $\sigma$T | $f_{co}$T | $d_{min}^2/E_b$ | BW efficiency bits/s/Hz | # of VA states/2D |
|---|---|---|---|---|---|---|
| 2 | 2 | 0.200 | 0.500 | 4.00 | 2.0 | 4 |
| 2 | 3 | 0.120 | 0.277 | 2.70 | 3.6 | 16 |
| 2 | 4 | 0.090 | 0.208 | 0.82 | 4.8 | 64 |
| 2 | 5 | 0.070 | 0.166 | 0.25 | 6.0 | 256 |
| 4 | 2 | 0.200 | 0.500 | 1.60 | 4.0 | 16 |
| 4 | 3 | 0.120 | 0.277 | 1.00 | 7.2 | 256 |

It will be understood that while preferred embodiments of the invention have been described, immaterial modifications may be made to the invention without departing from its substance and these are intended to be covered by the scope of the invention.

Further summary of the invention are found in the claims that follow.

```
Michel
main.f
ene9
```

Job: main.f
Date: Fri May 25 15:02:24 1990

```
************************************************************************
*                                                                      *
*                        MAIN PROGRAM                                  *
*                                                                      *
*           WRITTEN IN FORTRAN-77 :                                    *
*           PROGRAM THAT SIMULATES THE VARIOUS STAGES OF               *
*           THE TRANSMITTER REQUIRED TO IMPLEMENT "CONVERSION FILTERING*
*           FOR DIGITAL SIGNALING SYSTEMS                              *
*                                                                      *
*                                                                      *
************************************************************************ integer L,Lp,Nb,Lb,Ts,ratio,BL
        integer SNRdx,errorRe,errorIm
        integer pardex,tasknumb,startread
        integer toterrorRe(0:50),toterrorIm(0:50),
        integer totalerror(0:100)

real    var,Enumb(0:100)

character detector*12
        character equalizer*12
        character adaptation*12
        character precod*12,decod*12
        character shaping*12
        character MAP*12
        character info*12
        character filter*12
        character metric*12 common /IM1/L,Lp,Nb,Lb,Ts,ratio
        common /VM1/number
        common /IM2/var
        common /IM3/M,log2M
        common /NUM/numberBU
        common /IND/pardex,startread
        common /EQU/equalizer
        common /ADP/adaptation
        common /SHP/shaping
        common /ALP/alpha
        common /CODE/precod,decod
        common /DET/detector
        common /TASK/tasknumb
        common /MM/MAP
        common /CPM1/LL,BL
        common /INF/info
        common /FILTE/filter
        common /MET/metric
        common /LIMIT/lim1,lim2
        common /NOIN/indexn1,indexn2
        common /SYIN/indexs C       READ THE SYSTEM PARAMETERS
        call inputs C       READ THE CHARACTERISTICS OF THE CONVERSION FILTER
            call Gaus
            call GausWMF C       READ THE CHARACTERISTICS OF THE METRIC TO THE VA
            call GausmgtWMF

C**********************************************************************
```

```
        SNR = float(SNRdx)
        variance=(10**(-SNR/10.))*(M**2-1)/3./log2M
        var=sqrt(variance)

indexn1=1
            indexn2=2
            indexs =3 toterrorRe(SNRdx) = 0
            toterrorIm(SNRdx) = 0
            do 12 i=1,number C******** USE THE VITERBI ALGORITHM: "viterbiDET.f" FOR "L)0" ************
            call VitAlg(errorRe,errorIm)

toterrorRe(SNRdx) = toterrorRe(SNRdx)
     &                            + errorRe
            toterrorIm(SNRdx) = toterrorIm(SNRdx)
     &                            + errorIm
12          continue

C********************** ERROR RATES ***********************************

IF(MAP.eq.'QAM')THEN
            Bnumb=2.*number*numberBU
        ELSEIF(MAP.eq.'PAM')THEN
            Bnumb=1.*number*numberBU
        ENDIF IF(MAP.eq.'QAM')THEN
            totalerror(SNRdx)=toterrorRe(SNRdx)
     &                       +toterrorIm(SNRdx)
        ELSEIF(MAP.eq.'PAM')THEN
            totalerror(SNRdx)=toterrorRe(SNRdx)
        ENDIF Enumb(SNRdx)=totalerror(SNRdx)/Bnumb/float(log2M)
        print*,'TOTAL ERROR=',totalerror(SNRdx),'out of',
     &    Bnumb,'=)',' ',Enumb(SNRdx),' ','SNR=',float(SNRdx)

stop
    end
```

```
              1           n                    11
                          n                     1
                          h                     1
  m m mm     11    cccc   h hhh     eeee        1
  mm m  m     1    c   c  hh  h    e    e       1
  m  m  m     1    c      h   h    eeeeee       1
  m  m  m     1    c      h   h    e            1
  m  m  m     1    c   c  h   h    e   e·       1
  m  m  m    111   cccc   h   h     eeee       111

1                                 t              ff
                                      t             f  f
   ii    n nnn    p ppp    u   u   ttttt   ssss     f
    i    nn  n    pp  p    u   u     t    s    s   fffff
    i    n   n    p   p    u   u     t       ss     f
    i    n   n    p   p    u   u     t        ss    f
    i    n   n    pp  p    u   uu    t  t  s   s  ··  f
   iii   n   n    p ppp    uuu  u     tt    ssss  ··  f
                  p
                  p
                  p 11
                                     1
                                     1
   eeec   n nnn    eeee              1     999 9
  e    e  nn  n   e    e             1    9    99
  eeeeee  n   n   eeeeee             1    9     9
  e       n   n   e                  1    9     9
  e    e  n   n   e    e             1    9    99
   eeee   n   n    eeee             111    999 9
                                                 9
                                           9    9
                                            999
```

```
c
c    'inputs.f :  Read the system parameters needed to simulate
c                 "The Conversion Filtering for Digital Signaling Systems"
c
c++++++++++++++++++++++++++++++++++++++++++++++++++++++++++++++++++++++++ subroutine inputs integer L,Lp,Nb,Lb,Ts,ratio,BL
      integer pardex,tasknumb,startread,TOTBIN real    muc, mup, muphi, symbprd, dist
      real    rislbd, delta, lambda, pi, TWOPI, piover4, piover2
      real    threshold, threshold1 character junk*58,DFB*12,stationary*12
      character detector*12,mountain*12
      character print*12
      character decision*12
      character update*12
      character equalizer*12
      character adaptation*12
      character precod*12,decod*12
      character shaping*12
      character channel*12,IRdemand1*12,IRdemand2*12
      character filter*12,frequency*12
      character profilter*12
      character diversity*12
      character divcod*12
      character MAP*12
      character info*12
      character metric*12
      character checkk*12 common /IM1/L,Lp,Nb,Lb,Ts,ratio
      common /VM1/number
      common /VM2/numberVA,Npp
      common /IM6A/update
      common /c1/INTERMEDIATE
      common /IM6B/rislbd,delta
      common /phaspa1/dist
      common /phaspa2/dist1
      common /FILTER/Nk
      common /FILTEB/Mk
      common /FILTEA/La
      common /FILTEC/Ki
      common /FILTE/filter
      common /PRFILTE/prefilter
      common /IM5/M,log2M
      common /IM6/muc,mup,muphi
      common /IM7/numberIT,numberTR
      common /PIE/pi
      common /PIE8/piover8
      common /PIE4/piover4
      common /PIE2/piover2
      common /TWOPIE/TWOPI
      common /THET/THETAS
      common /ANSW/decision
      common /CHAN/channel
      common /CHAN1/stationary
      common /NUM/numberBU
      common /IND/pardex,startread
      common /EQU/equalizer
      common /ADP/adaptation
      common /SHP/shaping
      common /ALP/alpha
      common /CODE/precod,decod
      common /DET/detector
      common /TASK/tasknumb
      common /FREQ/frequency
      common /IR1/IRdemand1
      common /IR2/IRdemand2
      common /FEED/DFB
      common /ATT/atten
      common /BIN/TOTBIN
      common /NIN/NBIN
      common /MOU/mountain
      common /DIVE/diversity
      common /DIVD/distan
      common /DIV/divcod
```

```
      common /MM/MAP
      common /CFM1/LL,BL
      common /INF/info
      common /MET/metric
      common /SWI/threshold,threshold1
      common /CHEKK/checkk
      common /LIMIT/lim1,lim2 read(*,12)junk,print read(*,14)junk,M
      if(print.eq.'yes')print14,junk,M
      log2M=log(float(M))/log(2.)

read(*,12)junk,MAP
      if(print.eq.'yes')print12,junk,MAP

C Compute the sine and cosine table pi = 4. * atan(1.0)
      piover8 = pi/8.
      piover4 = pi/4.
      piover2 = pi/2.
      TWOPI= 2. * pi C********* CHOOSE THE VELOCITY OF THE CAR in Km/Hr (SET BY "Vc") ********
      read(*,13)junk,Vc
      if(print.eq.'yes')print13,junk,Vc C***** CHOOSE THE NUMBER OF BINS PER TIME INTERVAL (SET BY "Nb") ********
C****************** WHERE 1 BIN = 0.1 MICROSECOND **********************
C****** OR EQUIVALENTLY CHOOSE THE BAUD RATE = 10/Nb Mbaud ************
      read(*,14)junk,Nb
C     "Nb" is the number of adjacent bins (obtained from Hashemi's profiles)
C     that represent one time interval.
      if(print.eq.'yes')print14,junk,Nb
      junk='Baud rate in KBaud =                    :'
      if(print.eq.'yes')print13,junk,10000./float(Nb)

C
C     COMPUTE THE SYMBOL TIME INTERVAL (in microseconds)
C
      symbprd = Nb * 0.1
      junk='Symbol Time interval in microseconds =  :'
      if(print.eq.'yes')print13,junk,symbprd READ(*,13)junk,FREQ
      if(print.eq.'yes')print13,junk,FREQ lambda = (3.E+8)/(FREQ*1.E+6)
      junk='travelling wavelength in meters =       :'
      if(print.eq.'yes')print13,junk,lambda DL = (Vc*1000./3600.)*symbprd*1.E-06/lambda
      junk='distance between samples in wavelength =:'
      if(print.eq.'yes')print13,junk,DL
      dist = TWOPI * DL READ(*,13)junk,freqoff
      if(print.eq.'yes')print13,junk,freqoff dist1 = TWOPI * freqoff * symbprd*1.E-06
      junk='degrees offset due to frequency offset/time int. = :'
      if(print.eq.'yes')print13,junk,360.*dist1/TWOPI C     NOTE: The channel profiles provided by Hashemi are 0.1 foot apart.
C           Thus, a certain number "INTERMEDIATE" of intermediate profiles
C           must be obtained between any 2 of Hashemi's profiles for
C           each time interval, where the paths and amplitudes are constant,
C           while phases are varying. In order to obtain "INTERMEDIATE" we
C           need to find the distance "DP" in meters which the car travels
C           during one time interval.
C           One time interval = Nb bins X 0.1 microsecond,
C           thus, DP = Nb bins X 0.1 microsecond X Vc Km/Hr X 1000/3600  or
C                 DP = Nb X Vc X e-07 X 5/18
      DP = Nb * Vc * 1.e-07 * 5./18.
      junk='Distance in m the car travels during one sym. int. = :'
      if(print.eq.'yes')print13,junk,DP
```

```
      if(DP.ne.0)then
          INTERMEDIATE = 0.1/(DP*3.)
      else
          INTERMEDIATE = 100000
      endif
      junk='number of symbol int. bet. 2 of Hashemi profiles=    :'
      if(print.eq.'yes')print14,junk,INTERMEDIATE C**************** THEREFORE, THE LENGTH OF ONE PROFILE IN **************
C**************** INTEGER NUMBER OF TIME INTERVALS is "Lb" **************
C*********** WHERE Lb=(70/Nb) If (70/Nb) IS AN INTEGER NUMBER. **************
C********************** OTHERWISE Lb=(70/Nb)+1. ****************************
      Lb=(70/Nb)
      if(Lb.lt.70./Nb)Lb=Lb+1
C     The significance of "Lb" is that the delay spread due to multipath
C     extends over Lb adjacent time intervals.
      junk='# of adj. time int. over which the delay spread exists= :'
      if(print.eq.'yes')print14,junk,Lb C********* READ THE NUMBER OF POINTS PER TIME INTERVAL (SET BY *********
C********* "Ts") SUCH THAT "Nb" IS AN INTEGER NUMBER OF "Ts" ***********
      read(*,14)junk,Ts
      if(print.eq.'yes')print14,junk,Ts C********** READ THE CHANNEL PROFILES FROM "urb(A-D).out" **************
      open(1,access='direct',recl=568,
     *         file='../../../../urbBbinary.out',
     *         status = 'old')
      open(10,file='phase')
      open(20,file='envelope')
      open(30,file='frequency')
      open(40,file='AFCsignal')

C*********** CHOOSE THE NUMBER OF COEFFICIENTS IN THE FORWARD FILTER *******
      read(*,14)junk,Nk
      if(print.eq.'yes')print14,junk,Nk C********* CHOOSE THE NUMBER OF COEFFICIENTS IN THE BACKWARD FILTER ****
      read(*,14)junk,Mk
      if(print.eq.'yes')print14,junk,Mk C********* CHOOSE THE NUMBER OF COEFFICIENTS IN THE AFC FILTER *********
      read(*,14)junk,La
      if(print.eq.'yes')print14,junk,La C********* CHOOSE THE ADAPTATION PARAMETERS FOR THE LMS ALG. ***********
      read(*,13)junk,muc
      muc=muc*3./(M**2-1)/Nk
      if(print.eq.'yes')print13,junk,muc read(*,13)junk,mup
      mup=mup*3./(M**2-1)/Mk
      if(print.eq.'yes')print13,junk,mup read(*,13)junk,muphi
      muphi=muphi*3./(M**2-1)
      if(print.eq.'yes')print13,junk,muphi C************* CHOOSE THE ADAPTATION PARAMETERS FOR THE RLS ALG.********
      read(*,13)junk,rlslbd
      if(print.eq.'yes')print13,junk,rlslbd read(*,13)junk,delta
      if(print.eq.'yes')print13,junk,delta C******************* RECEIVER PARAMETERS *******************************
      read(*,14)junk,tasknumb
      if(print.eq.'yes')print14,junk,tasknumb read(*,14)junk,startread
      if(print.eq.'yes')print14,junk,startread C** CHOOSE THE NUMBER OF SYMBOLS FOR INITIAL TRAINING (SET BY "numberIT") **
      read(*,14)junk,numberIT
      if(print.eq.'yes')print14,junk,numberIT
```

```
C**** CHOOSE THE NUMBER OF SYMBOLS TO BE USED FOR INTERMEDIATE TRAINING *****
C**************** SEQUENCE (SET BY "NUMBERTR") ****************************
      read(*,14)junk,numberTR
      if(print.eq.'yes')print14,junk,numberTR C** CHOOSE THE NUMBER OF SYMBOLS FOR DATA BURST (SET BY "numberBU") ******
      read(*,14)junk,numberBU
      if(print.eq.'yes')print14,junk,numberBU C** CHOOSE THE NUMBER OF ITERATIONS OF TRAINING+TRANSMISSION CYCLES ******
C************* (SET BY "NUMBER") **************************
      read(*,14)junk,number
      if(print.eq.'yes')print14,junk,number C********** CHOOSE THE COMPLEXITY OF THE VA (SET BY "L") WHERE **********
C********** THE NUMBER OF STATES OF THE VA IS EQUAL TO "2L" ************
      read(*,14)junk,L
C     "L" is the number of adjacent time intervals that interfer with the
C     present interval and which are taken into consideration by the VA.
C     Note: The program allows L to take a value up to 8.
      if(print.eq.'yes')print14,junk,L C********** CHOOSE THE START OF THE INTERFERING PULSE (SET BY "Npp") ****
C****************** CONSIDERED BY VA **************************
      read(*,14)junk,Npp
      if(print.eq.'yes')print14,junk,Npp C****** CHOOSE THE NUMBER OF SYMBOLS TO BE OBSERVED BY THE VA BEFORE ******
C**************** DETECTING EACH SYMBOL (SET BY "numberVA") **************
      read(*,14)junk,numberVA
      if(print.eq.'yes')print14,junk,numberVA C**************** CHOOSE THE PULSE **************************
C********** THE CHOICES ARE: **************************
C************ 1. THE SQRT of a RAISED_COSINE PULSE ****************
C************ 2. A RAISED_COSINE PULSE ****************************
C************ 3. A RECTANGULAR PULSE ****************************
C************ 4. A MSK PULSE ****************************
C************ 5. A LCPM PULSE ****************************
C************ 6. A BANDLIMITED LCPM PULSE ****************************
      read(*,15)junk
      read(*,12)junk,shaping
      print12,junk,shaping read(*,13)junk,alpha
      print13,junk,alpha read(*,14)junk,LL
      print14,junk,LL read(*,14)junk,BL
      print14,junk,BL read(*,12)junk,info
      print12,junk,info C**************** CHOOSE THE CHANNEL TYPE **************************
      read(*,12)junk,channel
      print12,junk,channel
C     Possible choices are: "Hashemi" which corresponds to an urban mobile
C     channel, and "Gaussian" which correpsonds to a Gaussian channel without
C     ISI.

read(*,12)junk,stationary
      if(print.eq.'yes')print12,junk,stationary read(*,12)junk,mountain
      print12,junk,mountain read(*,13)junk,distance
      print13,junk,distance TOTBIN = (1.E+7)*(2.*distance)/(3.E+5)
      junk='time delay in bins of a reflected signal off objects   :'
      if(print.eq.'yes')print14,junk,TOTBIN
```

```
        atten=1.
        if(distance.ne.0)atten = 4./(2.*distance)
        junk='attenuation of the signal reflected off mountains      :'
        if(print.eq.'yes')print13,junk,atten read(*,13)junk,THETAS
        THETAS = THETAS * TWOPI
        print13,junk,THETAS NBIN=70
        if(mountain.eq.'yes')THEN
          NBIN=141
          Lb=(TOTBIN/Nb)
          if(Lb.lt.1.*TOTBIN/Nb)Lb=Lb+1
C       The significance of "Lb" is that the delay spread due to multipath
C       extends over Lb adjacent time intervals.
        junk='# of adj. time int. over which the delay spread exists= :'
          if(print.eq.'yes')print14,junk,Lb
        endif if(channel.eq.'Gaussian'.or.channel.eq.'Single')Lb=0

C*************** CHOOSE THE NOISE VARIANCE *******************
        read(*,14)junk,lim1
        if(print.eq.'yes')print14,junk,lim1
        read(*,14)junk,lim2
        if(print.eq.'yes')print14,junk,lim2

C*************** CHOOSE THE TYPE OF THE FORWARD FILTER ***************
        read(*,12)junk,filter
        print12,junk,filter C************* CHOOSE THE TYPE OF THE PREFILTER ***************
        read(*,12)junk,prefilter
        print12,junk,prefilter C*************** CHOOSE THE ADAPTATION ALGORITHM ***************
        read(*,12)junk,update
        print12,junk,update read(*,12)junk,decision
        print12,junk,decision read(*,15)junk
        read(*,12)junk,precod
        print12,junk,precod read(*,15)junk
        read(*,12)junk,decod
        print12,junk,decod read(*,12)junk,detector
        print12,junk,detector read(*,12)junk,metric
        print12,junk,metric read(*,12)junk,equalizer
        print12,junk,equalizer read(*,12)junk,DFB
        print12,junk,DFB read(*,12)junk,adaptation
        print12,junk,adaptation read(*,12)junk,frequency
        if(print.eq.'yes')print12,junk,frequency read(*,12)junk,IRdemand1
        if(print.eq.'yes')print12,junk,IRdemand1 read(*,12)junk,IRdemand2
        if(print.eq.'yes')print12,junk,IRdemand2 read(*,12)junk,diversity
        print12,junk,diversity read(*,13)junk,distan
```

```
         print13,junk,distan if(diversity.eq.'space')distan=distan * TWOPI read(*,12)junk,divcod
         print12,junk,divcod read(*,14)junk,K1
         print14,junk,K1 read(*,13)junk,threshold
         print13,junk,threshold
         threshold = threshold**2 read(*,13)junk,threshold1
         print13,junk,threshold1
         threshold1 = threshold1**2 read(*,12)junk,checkk 15       format(a57)
14       format(a57,I7)
13       format(a57,F9.4)
12       format(a57,a12)
10       format(a12)

call check return
         end
```

Job: check.f
Date: Fri May 25 15:05:16 1990

```
c
c       check.f : check the system parameters
c
c++++++++++++++++++++++++++++++++++++++++++++++++++++++++++++++++++++ subroutine check integer L,Lp,Nb,Lb,Ts,ratio,BL
        character junk*58
        character detector*12
        character equalizer*12
        character adaptation*12
        character precod*12,decod*12
        character shaping*12
        character filter*12,DFB*12
        character info*12
        character prefilter*12
        character MAP*12 common /IM1/L,Lp,Nb,Lb,Ts,ratio
        common /VM1/number
        common /VM2/numberVA,Npp
        common /FILTER/Nk
        common /FILTEB/Mk
        common /FILTEL/Lk
        common /FILTE/filter
        common /DELAY/Nkk
        common /REMEM/Nkp
        common /EQU/equalizer
        common /ADP/adaptation
        common /SHP/shaping
        common /CODE/precod,decod
        common /DET/detector
        common /FEED/DFB
        common /CPM1/LL,BL
        common /INF/info
        common /PRFILTE/prefilter
        common /phaspa1/dist
        common /phaspa2/dist1
        common /MM/MAP if(shaping.eq.'raisecos'.or.shaping.eq.'sqraisecos'.or.
     &     shaping.eq.'triangle')then
           Lp=14
           if(filter.eq.'realmatch'.or.
     &        prefilter.eq.'realmatch')Lk=1
           if(filter.eq.'idealmatch'.or.
     &        prefilter.eq.'idealmatch')Lk=Ts
        elseif(shaping.eq.'rectan')then
           Ts=4
           Nk=9
           Lp=1
           Lk=Ts
        elseif(shaping.eq.'MSK')then
           Ts=4
           Lp=2
           Lk=1
        elseif(shaping.eq.'LCPM'.and.BL.eq.100.and.info.eq.'pulse')then
           Ts=4
           Lp=LL
           Lk=1
        elseif(shaping.eq.'LCPM'.and.BL.ne.100.and.info.eq.'pulse')then
           Ts=4
           Lp=LL+12
           Lk=1
        elseif(shaping.eq.'LCPM'.and.BL.eq.100.and.info.eq.'auto')then
           Ts=1
           Lp=2*LL
           Lb=1
           Lk=1
           Nk=Lp+5
           Mk=Lp/2
        elseif(shaping.eq.'LCPM'.and.BL.ne.100.and.info.eq.'auto')then
           Ts=1
           Lp=2*(LL+10)
           Lb=1
           Lk=1
           Nk=Lp+5
           Mk=Lp/2
```

```
    elseif(shaping.eq.'LCPM'.and.BL.eq.100.and.info.eq.'WMF')then
      Ts=1
      Lp=LL
      Lb=1
      Lk=1
    elseif(shaping.eq.'LCPM'.and.BL.ne.100.and.info.eq.'WMF')then
      Ts=1
      Lp=(LL+10)
      Lb=1
      Lk=1
    elseif(shaping.eq.'Gauss'.and.info.eq.'auto')then
      Ts=1
      Lp=2*(LL+3)
      Lb=1
      Lk=1
      Nk=Lp+5
      Mk=Lp/2
    elseif(shaping.eq.'Gauss'.and.info.eq.'pulse')then
      Ts=1
      Lp=2*(LL+3)
      Lb=1
      Lk=1
      Nk=Lp+5
      Mk=Lp/2
    elseif(shaping.eq.'Gauss'.and.info.eq.'WMF')then
      Ts=1
      Lp=(LL+3)
      Lb=1
      Lk=1
      Nk=Lp+5
      Mk=Lp-1
    endif IF(equalizer.eq.'withouteq')THEN if(info.eq.'pulse')then
        if(filter.eq.'realmatch'.or.
   &          prefilter.eq.'realmatch')then
          Nkk=(Lp/2)+(Lp/2)
        elseif(filter.eq.'idealmatch'.or.
   &          prefilter.eq.'idealmatch')then
          Nkk=(Lp/2)+(Lp/2)+Lb
        elseif(filter.eq.'nomatch')then
          Nkk=(Lp/2)
        endif elseif(info.eq.'WMF')then
        Nkk=0
        Npp=1
c       if(MAP.eq.'QAM'.and.L.eq.2)Npp=2
        if(L.eq.6)Npp=2
        if(L.eq.7)Npp=2
        if(L.eq.8)Npp=3
        numberVA=(L+1)*5 elseif(info.eq.'auto')then
        Nkk=0
        Npp=2*L+3
        numberVA=(L+1)*5
      endif ELSEIF(equalizer.eq.'adaptequ'.or.equalizer.eq.'fixedeq')THEN if(info.eq.'pulse'.or.info.eq.'auto')then
        if((filter.eq.'realmatch'.or.filter.eq.'idealmatch'
   &       .or.prefilter.eq.'realmatch'.or.
   &           prefilter.eq.'idealmatch').
   &                                   and.DFB.eq.'both')then
          Nkk=(Lp/2)+(Lp/2)+(Nk-1)/Ts
        elseif((filter.eq.'realmatch'.or.filter.eq.'idealmatch'
   &       .or.prefilter.eq.'realmatch'.or.
   &           prefilter.eq.'idealmatch').
   &                                   and.DFB.eq.'fore')then
          Nkk=(Lp/2)+(Lp/2)+(Nk-1)/Ts/2 elseif(filter.eq.'nomatch'.and.DFB.eq.'both')then
          Nkk=(Lp/2)+(Nk-1)/Ts
        elseif(filter.eq.'nomatch'.and.DFB.eq.'fore')then
          Nkk=(Lp/2)+(Nk-1)/Ts/2
```

```
        elseif(filter.eq.'WMF'.and.DFB.eq.'estimator')then
           Nkk=(Lp/2)+(Nk-1)/Ts
        endif elseif(info.eq.'WMF')then
         if(filter.eq.'nomatch'.and.DFB.ne.'both'.and.
     &                   DFB.ne.'fore')then
            Nkk=0
         endif
        endif

ENDIF

C       if(shaping.eq.'rectan'.and.filter.eq.'idealmatch')then
C              Nkk=1
C              Lk=Ts+1
C       endif junk='# of samples per time interval =             :'
        print14,junk,Ts ratio=(Nb/Ts)
        junk='ratio of samples bet. actual pulse and decimated pulse =:'
        print14,junk,ratio
        IF((Nb/Ts).ne.float(Nb)/float(Ts))THEN
             PRINT*,'Ts NOT AN INTEGER NUMBER OF Nb'
             stop
        endif junk='number of taps in forward filter =            :'
        print14,junk,Nk junk='number of taps in backward filter =           :'
        print14,junk,Mk C       "Lp" is the number of time intervals over which the transmitting
C       filter has a nonzero IR (excluding the desired interval),
C       i.e. it is the length of the shaping pulse "pulse(t)" -1.
        junk='# of time intervals over which the transmitting filter '
        print11,junk
        junk='has a nonzero IR (excluding the desired interval [0,T])=:'
        print14,junk,Lp junk='delay in feedback loop Nkk =                  :'
        print14,junk,Nkk Nkp=max(Nkk,Lp+Lb-1)
        ij=(Nk/Ts)
        if(ij.lt.float(Nk)/float(Ts))ij=ij+1
        Nkp=max(Nkp,ij)
        Nkp=max(Nkp,Npp)
        junk='number of symbols to remember =               :'
        print14,junk,Nkp dist = dist/float(Ts)
        dist1 =dist1/float(Ts)

IF((Nb/Ts).ne.float(Nb)/float(Ts))
     &            PRINT*,'WARNING: Ts NOT AN INTEGER NUMBER OF Nb'

C****************************** CHECKING INCONSISTENCY ******************
        if(detector.eq.'Symbol')then
          if(precod.eq.'noprecod'.and.decod.ne.'symdecod')
     &         print*,'inconsistent'
          if(precod.eq.'diffprecod'.and.decod.ne.'diffdecod')
     &         print*,'inconsistent'
          if(precod.eq.'DQPSKprecod'.and.decod.ne.'DQPSKdecod'.and.
     &       decod.ne.'DQdifdecod')
     &         print*,'inconsistent'
        endif if(detector.eq.'Viterbi')then
          if(precod.ne.'noprecod'.or.decod.ne.'symdecod')
     &         print*,'inconsistent'
        endif
```

```
14      format(a57,I6)
13      format(a57,F9.4)
12      format(a57,a12)
11      format(a57)
10      format(a12)

return
        end
```

```
                                    h                    11
                     1              h                     1
                                    h                     1
  m m mm       11      cccc     h nnn       eeee          1
  mm m  m       1     c    c    hh  h      e    e         1
  m  m  m       1     c         h   h      eeeee          1
  m  m  m       1     c         h   h      e              1
  m  m  m       1     c    c    h   h      e    e.        1
  m  m  m      111     cccc     h   h       eeee         111

GGGG                                                   ff
    G    G                                                 f  f
   G                                                       f
   G           aaaa     u    u    ssss                     f
   G                    u    u   s    s                  fffff
   G   GGGG    aaaaa    u    u    ss                       f
   G    G    a     a    u    u      ss                     f
    G   G    a    aa    u   uu   s    s       ..           f
     GGGG     aaaa a     uuu u    ssss         ..          f 11
                                    1
                                 .  1
    eeee    n nnn     eeee          1         sss s
   e    e   nn   n   e    e         1        e    ss
   eeeeee   n    n   e+eeee         1        s     s
   e        n    n   e              1        s     s
   e    e   n    n   e    e         1        s    ss
    eeee    n    n    eeee         111        sss s
                                                   s
                                              s    s
                                               ssss
```

```
Job:  Gaus.f
Date: Fri May 25 15:06:15 1990
```

```
C       Subroutine used for generating the conversion filter.

subroutine Gaus
        integer L,Lp,Nb,Lb,Ts,ratio,BL
        complex pulse(0:10000)
        REAL    Pi,t,sigma common /IM1/L,Lp,Nb,Lb,Ts,ratio
        common /IM3/pulse
        common /CPM1/LL,BL if(BL.ne.100)then
           call GausBL
           goto 114
        endif C*********************************************************
        Pi=3.1415926535897932384E0 if(LL.eq.1)sigma=0.2
        if(LL.eq.2)sigma=0.12
        if(LL.eq.3)sigma=0.09
        if(LL.eq.4)sigma=0.07
        if(LL.eq.5)sigma=0.06
        if(LL.eq.6)sigma=0.05
        if(LL.eq.7)sigma=0.044
        if(LL.eq.8)sigma=0.037 fo=0.25 do 10 i=0,10000
           pulse(i)=(0.,0.)
10      continue do 11 i=0,Lp*Nb
           t=(i-Lp*Nb/2.)/float(Nb)
           pulsee = sqrt(2.*sigma*sqrt(Pi))*
     &              exp(-2.*(Pi*t*sigma)**2)

pulseRe = pulsee * cos(2.*Pi*fo*t)
           pulseIm = pulsee * sin(2.*Pi*fo*t)

pulse(i) = cmplx(pulseRe , pulseIm)
11      continue

C****************** NORMALIZATION *************************
114     if(BL.ne.100)then
           Lp=2*Lp
           Nb=Nb/2
           ratio=ratio/2
        endif PNORM=0.
        do 15 i=0,Lp*Ts
           PNORM=PNORM+pulse(i*ratio)*conjg(pulse(i*ratio))
C          print*,i,pulse(i*ratio)
15      continue print*,'PNORM=',PNORM
        PNORM=sqrt(PNORM)
        do 16 i=0,Lp*Nb
           pulse(i)=pulse(i)/PNORM
C          print*,i,pulse(i)
16      continue if(BL.ne.100)then
           Lp=Lp/2
           Nb=Nb*2
           ratio=ratio*2
        endif return
        end
```

```
Michel
Gausmet WMF
eneid
```

Job: GausmetWMF.f
Date: Fri May 25 15:07:40 1990

```
C    Subroutine used for generating the metric needed in the
D    VA used to detect the signal generated using the conversion filter.

subroutine GausmetWMF
     integer L,Lp,Nb,Lb,Ts,ratio,BL
     complex ppp(0:100)

common /IM1/L,Lp,Nb,Lb,Ts,ratio
     common /PPRI/ppp
     common /CPM1/LL,BL
     common /FILTER/Nk
     common /FILTEB/Mk open(14,file='GAUSS/pre1.met')
     open(24,file='GAUSS/pre2.met')
     open(34,file='GAUSS/pre3.met')
     open(44,file='GAUSS/pre4.met')
     open(54,file='GAUSS/pre5.met')
     open(64,file='GAUSS/pre6.met')
     open(74,file='GAUSS/pre7.met')
     open(84,file='GAUSS/pre8.met')

do 12 i=0,Lp
        pppim=0.
        if(LL.eq.1)read(14,*)j,pppre,pppim
        if(LL.eq.2)read(24,*)j,pppre,pppim
        if(LL.eq.3)read(34,*)j,pppre
```

```
        if(LL.eq.4)read(44,*)j,pppre
        if(LL.eq.5)read(54,*)j,pppre
        if(LL.eq.6)read(64,*)j,pppre
        if(LL.eq.7)read(74,*)j,pppre
        if(LL.eq.8)read(84,*)j,pppre
        ppp(i)=cmplx(pppre,pppim)
12      continue return
        end
```

```
                    Michel
                   GausWMF
                    one9
```

Job: GausWMF.f
Date: Fri May 25 15:09:18 1990

C       Subroutine used for generating the conversion filter.

```
        subroutine GausWMF
        integer L,Lp,Nb,Lb,Ts,ratio,BL
        complex pp(0:100),ff(0:100),p(0:100),f(0:100)
        character info*12 common /IM1/L,Lp,Nb,Lb,Ts,ratio
        common /FRI/pp
        common /FRI/ff
        common /IMB/f,p
        common /CPM1/LL,BL
        common /FILTER/Nk
        common /FILTEB/Mk
        common /INF/info open(11,file='GAUSS/pre1.WMF')
        open(21,file='GAUSS/pre2.WMF')
```

```
open(31,file='GAUSS/pre3.WMF')
open(41,file='GAUSS/pre4.WMF')
open(51,file='GAUSS/pre5.WMF')
open(61,file='GAUSS/pre6.WMF')
open(71,file='GAUSS/pre7.WMF')
open(81,file='GAUSS/pre8.WMF')

do 12 i=0,Lp
    ppim=0.
    if(LL.eq.1)read(11,*)j,ppre,ppim
    if(LL.eq.2)read(21,*)j,ppre,ppim
    if(LL.eq.3)read(31,*)j,ppre
    if(LL.eq.4)read(41,*)j,ppre
    if(LL.eq.5)read(51,*)j,ppre
    if(LL.eq.6)read(61,*)j,ppre
    if(LL.eq.7)read(71,*)j,ppre
    if(LL.eq.8)read(81,*)j,ppre
    pp(i)=cmplx(ppre,ppim)
    p(i)=cmplx(ppre,ppim)
12  continue return
    end
```

Michel VitAlg.f eng

Job: VitAlg.f
Date: Fri May 25 15:11:44 1990

```
C       Subroutine the represents the VA used in the detection of
C       the signal generated using the conversion filter.

subroutine VitAlg(errorRe,errorIm)
        integer t,errorRe,errorIm,flag,
     &          indRe(-5:55,0:2048),
     &          jjRe(-20:100),jjIm(-20:100)
        real    t4Re(0:4096)
        complex ind(-5:55,0:64,0:64)
        complex t4(0:128,0:128)
        complex ahat(0:100),jj1(0:100),jj2(0:100),z,y,
     &          p(0:100),f(0:100),r(0:100)
        integer L,Lp,Nb,Lb,Ts,ratio
        character precod*12,decod*12,DFB*12
        character adaptation*12,filter*12,frequency*12
        character metric*12
        character MAP*12
        character info*12 common /IM1/L,Lp,Nb,Lb,Ts,ratio
        common /IM5/M,log2M
        common /NUM/numberBU
        common /VM2/numberVA,Npp
        common /IM8/f,p
        common /IM9/r,z
        common /DELAY/Nkk
        common /INPUT/jj1,ahat
        common /SYMBOL/jjRe,jjIm
        common /OUTPUT/y
        common /INPUT2/jj2
        common /CODE/precod,decod
        common /VITIND/indRe
        common /VITINT/ns,t
        common /VITI/ind
        common /flags/flag
        common /ADP/adaptation
        common /FILTE/filter
        common /FILTEL/Lk
        common /FREQ/frequency
        common /FEED/DFB
        common /MET/metric
        common /MM/MAP
        common /INF/info save JFLAG
        data JFLAG/0/ ns=M**L
        errorRe=0
        errorIm=0
        flag=0 if(JFLAG.eq.0)then
           do 35 i=-Npp,numberVA+Npp
              jjRe(i)=M-1
              jjIm(i)=M-1
              if(MAP.eq.'PAM')jj1(i)=cmplx(M-1,0)
              if(MAP.eq.'QAM')jj1(i)=cmplx(M-1,M-1)
35         continue
           JFLAG=1
        endif t=0

C*** WE ARE STARTING A LOOP WHICH WILL PERFORM THE REQUIRED DETECTION ****
C************ FOR "numberBU" TIMES UNTIL ALL SYMBOLS ARE DETECTED ************

45      t=t+1

C***** Read input symbols which will be convolved with the channel IR ******
        if(precod.eq.'noprecod')   call noprecod(jj1)

jjRe(t-flag+Nkk)=real(jj1(0))
        jjIm(t-flag+Nkk)=aimag(jj1(0))

do 11 kk=0,Ts-1

C******** CONVOLVE THE TRANSMITTED SIGNAL WITH THE IR OF THE CHANNEL ******
C******** AND ADD AWGN TO THE SIGNAL OUTPUT FROM THE CHANNEL ****************
        if(info.eq.'WMF')call channelWMF(kk)
```

```
11      continue if(MAP.eq.'PAM')then
C*********** UPDATE THE METRICS USED IN THE VA ***************
        if(metric.eq.'WMF')call metricWMF(t4Re)

C********** PERFORM THE VA OPERATION WITH AN EQUALIZED INPUT ***********
        call vitmin(t4Re)

C**************** DECODE THE RECEIVED SIGNAL AND ******************
C******** FIND THE DESIRED SIGNAL NEEDED FOR THE FORWARD FILTER ******
C******************** AND THE BACKWARD FILTER ********************
        call vitdecod(errorRe,errorIm)

elseif(MAP.eq.'QAM')then
C       print*,'MAP=',MAP
C************* UPDATE THE METRICS USED IN THE VA *****************
        if(metric.eq.'WMF')call metricWMFQ(t4)

C********** PERFORM THE VA OPERATION WITH AN EQUALIZED INPUT ***********
        call vitminQ(t4)

C**************** DECODE THE RECEIVED SIGNAL AND ******************
C******** FIND THE DESIRED SIGNAL NEEDED FOR THE FORWARD FILTER ******
C******************** AND THE BACKWARD FILTER ********************
        call vitdecodQ(errorRe,errorIm)

endif
C***********************************************************************
        if(t.lt.numberVA)goto 45 if(t.le.numberBU)then
            flag=flag+1
C************* SHIFT ind(k,iii) AND jj(k) BY ONE STEP ****************
        if(MAP.eq.'PAM')then
            do 85 k=-Npp+1,numberVA+Npp
                jjRe(k)=jjRe(k+1)
85          continue do 86 k=1,numberVA-1
            do 86 iii=0,nm-1
                indRe(k,iii)=indRe(k+1,iii)
86          continue elseif(MAP.eq.'QAM')then do 87 k=-Npp+1,numberVA+Npp
                jjRe(k)=jjRe(k+1)
                jjIm(k)=jjIm(k+1)
87          continue do 88 k=1,numberVA-1
            do 88 iiiRe=0,nm-1
            do 88 iiiIm=0,nm-1
                ind(k,iiiRe,iiiIm)=ind(k+1,iiiRe,iiiIm)
88          continue
        endif
        goto 45 endif return
        end
```

```
                                        Job: noprecod.f
                                        Date: Fri May 25 15:12:51 1990

C       Subroutine used to generate PAM or QAM, with a 1:1 precoder
C       to be used as the encoder prior to the conversion filter.

subroutine noprecod(jj1)
        integer kk(6),cc
        complex jj1(0:100),jj2(0:100)
        integer L,Lp,Nb,Lb,Ts,ratio
        complex QAMmap common /IM1/L,Lp,Nb,Lb,Ts,ratio
        common /IM3/M,log2M
        common /REMEM/Nkp
        common /INPUT2/jj2
        common /SYIN/indexs save cc
        data cc/0/ do 46 i=Nkp,1,-1
           jj1(i)=jj1(i-1)
           jj2(i)=jj2(i-1)
46      continue
        do 16 i=1,2*log2M
           s=urand(indexs)
           if(s.lt.0.5)kk(i)=-1
           if(s.ge.0.5)kk(i)=+1
16      continue
        jj2(0)=QAMmap(kk)

C***************** PRECODING ****************************
```

```
C       jj1(0)=1.*jj2(0)
C       cc=cc+1
C       jj2(0)=0
C       jj1(0)=0.
C       if(cc.eq.15)then
C           jj2(0)=1
C           jj1(0)=1.
C       endif return
        end
```

```
         Michel

QAMmap.f eng
```

Job: QAMmap.f
Date: Fri May 25 15:14:49 1990

Function that maps binary information into
M-ary symbols, with real or complex symbols.

```
complex function QAMmap(kk)
integer kk(*)
character MAP*12 common /IM5/M,log2M
common /MM/MAP if(MAP.eq.'QAM')THEN
    if(log2M.eq.1)then
        QAMmap = cmplx(kk(1),kk(2))
        return
    endif
endif
```

```
        if(log2M.eq.2)then
            QAMmap = cmplx(kk(1)*(2-kk(2)),kk(3)*(2-kk(4)))
            return
        endif
ELSEIF(MAP.eq.'PAM')THEN
        if(log2M.eq.1)then
            QAMmap = cmplx(kk(1),0)
            return
        endif if(log2M.eq.2)then
            QAMmap = cmplx(kk(1)*(2-kk(2)),0)
            return
        endif
ENDIF end
```

```
                                  Michel

Vitmin.f encd
```

Job: vitmin.f
                                            Date: Fri May 25 15:15:13 1990

```
C       Subroutine used for performing the minimization of the
C       metrics in the VA.

subroutine vitmin(t4Re)

integer indRe(-5:55,0:2048),t,flag,hh
        real    vre(0:2048),vrel(0:2048),mino,t4Re(0:4096)
        complex r(0:100),z
        integer L,Lp,Nb,Lb,Ts,ratio
        character metric*12 common /IM1/L,Lp,Nb,Lb,Ts,ratio
```

```
      common /IM5/M,log2M
      common /VITIND/indRe
      common /VITINT/nm,t
      common /VITV/vre
      common /IM9/r,2
      common /flags/flag
      common /MET/metric save JFLAG
      data JFLAG/0/ zre=real(z)
      zim=aimag(z)

if(JFLAG.EQ.0)THEN do 30 i=0,nm
            vre(i)=100000000.
30       continue do 37 i1=0,M-1
            mino=100000000.
            iii=1*i1
            do 38 if=0,0
               i=iii+nm*if
               if(metric.eq.'WMF')arg=(t4Re(i)-zre)**2
               if(metric.eq.'auto')
     &            arg=((M-1)-2*i1)*(t4Re(i)-2.*zre)
               if(mino.gt.arg)then
                  mino=arg
                  hh=if
               endif
38          continue
            vre(iii)=mino
            indRe(t-flag,iii)=hh
37       continue

JFLAG=1
         RETURN

ENDIF do 62 i1=0,M-1
      do 62 ij=0,nm/M-1
         mino=100000000.
         iii=1*i1+M*ij
         do 63 if=0,M-1
            i=iii+nm*if
            ii=(i-i1)/M
            if(metric.eq.'WMF')arg=vre(ii)+(t4Re(i)-zre)**2
            if(metric.eq.'auto')
     &         arg=vre(ii)+((M-1)-2*i1)*(t4Re(i)-2.*zre)
            if(mino.gt.arg)then mino=arg
               hh=if
            endif
63       continue
         vrel(iii)=mino
c        print*,'minimum,hhre=',mino,hh
         indRe(t-flag,iii)=hh
62    continue do 75 ii=0,nm-1
         vre(ii)=vrel(ii)
75    continue return
      end
```

```
Michael vitminQ.f eneig
```

Job: vitminQ.f
Date: Fri May 25 15:15:35 1990

```fortran
C       Subroutine used for performing the minimization of the
C       metrics in the VA.

subroutine vitminQ(t4)

integer t,flag
        complex ind(-5:55,0:64,0:64)
        complex t4(0:128,0:128)
        integer hhRe,hhIm
        real    v(0:64,0:64),v1(0:64,0:64),minQ
        complex r(0:100),z
        complex l1
        integer L,Lp,Nb,Lb,Ts,ratio
        character metric*12
        character MAP*12 common /IM1/L,Lp,Nb,Lb,Ts,ratio
        common /IM5/M,log2M
        common /VITINT/nm,t
        common /VITI/ind
        common /VIR/v
        common /IMV/r,z
        common /flags/flag
        common /MET/metric
        common /MM/MAP save JFLAG
        data JFLAG/0/ if(JFLAG.EQ.0)THEN
```

```
        do 30 iRe=0,nm
        do 30 iIm=0,nm
          v(iRe,iIm)=100000000.
30      continue do 37 iiRe=0,M-1
        do 37 iiIm=0,M-1
          mino=100000000.
          iiiRe=1*iiRe
          iiiIm=1*iiIm
          i1=cmplx((M-1)-2*iiRe,2*iiIm-(M-1))
          do 38 ifRe=0,0
          do 38 ifIm=0,0
            iRe=iiiRe+nm*ifRe
            iIm=iiiIm+nm*ifIm
        if(metric.eq.'WMF')
    &       arg=(t4(iRe,iIm)-z)*conjg(t4(iRe,iIm)-z)
        if(metric.eq.'auto')
    &       arg=real(i1*(t4(iRe,iIm)-2.*z))
        if(mino.gt.arg)then
            mino=arg
            hhRe=ifRe
            hhIm=ifIm
        endif
38      continue
          v(iiiRe,iiiIm)=mino
          ind(t-flag,iiiRe,iiiIm)=cmplx(hhRe,hhIm)
37      continue

JFLAG=1
        RETURN
      ENDIF do 62 iiRe=0,M-1 do 62 iiIm=0,M-1
          i1=cmplx((M-1)-2*iiRe,2*iiIm-(M-1))
        do 62 ijRe=0,nm/M-1
        do 62 ijIm=0,nm/M-1
          mino=100000000.
          iiiRe=1*iiRe+M*ijRe
          iiiIm=1*iiIm+M*ijIm
          do 63 ifRe=0,M-1
          do 63 ifIm=0,M-1
            iRe=iiiRe+nm*ifRe
            iIm=iiiIm+nm*ifIm
            iiRe=(iRe-iiRe)/M
            iiIm=(iIm-iiIm)/M
        if(metric.eq.'WMF')
    &       arg=v(iiRe,iiIm)+
    &           (t4(iRe,iIm)-z)*conjg(t4(iRe,iIm)-z)
        if(metric.eq.'auto')
    &       arg=v(iiRe,iiIm)+real(i1*(t4(iRe,iIm)-2.*z))
        if(mino.gt.arg)then
            mino=arg
            hhRe=ifRe
            hhIm=ifIm
        endif
63      continue
        v1(iiiRe,iiiIm)=mino
c       print*,iiiRe,iiiIm,'minimum,hhre,hhim=',mino,hhre,hhim
        ind(t-flag,iiiRe,iiiIm)=cmplx(hhRe,hhIm)
62      continue do 75 iiRe=0,nm-1
        do 75 iiIm=0,nm-1
          v(iiRe,iiIm)=v1(iiRe,iiIm)
c       print*,iiRe,iiIm,'vitminQ',v(iiRe,iiIm),ind(t-flag,iiRe,iiIm)
75      continue return
        end
```

```
                    Michel
                    Videocod
                    ene 19
```

```
                                    Job:  vitdecod.f
                                    Date: Fri May 25 15:16:03 1990

C       Subroutine used for decoding QAM, with a 1:1 precoding,
C       for a VA, with equalization.

subroutine vitdecod(errorRe,errorIm)

integer indRe(-5:55,0:2048),t,flag,
     &          hhhRe,jjRe(-20:100),jjIm(-20:100),
     &          jre(0:100),jim(0:100),errorRe,errorIm
        real    vre(0:2048),mino
        complex ahat(0:100), jj1(0:100),r(0:100),z,y
        character decision*12
        character equalizer*12
        integer L,Lp,Nb,Lb,Ts,ratio
        character info*12
        character metric*12 common /IM1/L,Lp,Nb,Lb,Ts,ratio
        common /INPUT/jj1,ahat
        common /IM5/M,log2M
        common /VM2/numberVA,Npp
        common /DELAY/N&k
        common /ANSW/decision
        common /VITV/vre
        common /VITIND/indRe
        common /VITINT/nm,t
        common /SYMBOL/jjRe,jjIm
        common /EQU/equalizer
        common /IM9/r,z
        common /OUTPUT/y
        common /NUM/numberBU
        common /INF/info
        common /MET/metric
        common /flags/flag
```

```
            mino=100000000.
            do 80 iii=0,nm-1
               if(mino.gt.vre(iii))then
                  mino=vre(iii)
                  hhhRe=iii
               endif
80          continue
C           print*,'minimum',mino,hhhRe 111         index1=min0(numberVA,t)
C           print*,'XRE',z-y,jjRe(index1+Nkk)
            iii=hhhRe
            do 90 k=index1,1,-1
               if=indRe(k,iii)
               iii=(iii/M)+(nm/M)*if
               ii=iii-M*(iii/M)
               kk=index1-k
               if(metric.eq.'auto')jre(kk)=(M-1)-2*if
               if(metric.eq.'NMF')jre(kk)=(M-1)-2*ii
C              print*,jre(kk),jjRe(k+Nkk-Npp),'        Re',t
               if(t.gt.numberBU.and.info.ne.'auto'.and.
     &            jre(kk).ne.jjRe(k+Nkk-Npp))errorRe=errorRe+1
C              if(t.gt.numberBU)print*,jre(kk),jjRe(k+Nkk-Npp),'***    Re',t
90          continue 112         if(t.le.numberBU.and.t.gt.numberVA)then
               if(jre(numberVA-1).ne.jjRe(Nkk-Npp+1))errorRe=errorRe+1
C              print*,'***Re',jre(numberVA-1),jjRe(Nkk-Npp+1),t
            endif if(equalizer.eq.'withouteq')return C************ DESIRED SIGNAL ********************
            if(decision.eq.'ideal')then
               call ideal
            else
               index2=min0(L+NUMB,t-1)
               do 18 i=0,index2
                  ahat(i)=cmplx(jre(i),jim(i))
18             continue C              do 20 i=0,L
C                 print*,'ahatRe',i,ahatRe(i),jjRe1(i+Nkk)
C20             continue
C              do 21 i=0,L
C                 print*,'ahatIm',i,ahatIm(i),jjIm1(i+Nkk)
C21             continue
            endif return
            end
```

```
                    Michael
                    vitdecodQ
                    eng
```

```
                                        Job:  vitdecodQ.f
                                        Date: Fri May 25 15:16:30 1990
```

```
c       Subroutine used for decoding QAM, with a 1:1 precoding,
c       for a VA, with equalization.

subroutine vitdecodQ(errorRe,errorIm)

complex ind(-5:55,0:64,0:64)
        integer t,flag,
     &          hhhRe,hhhIm,jjRe(-20:100),jjIm(-20:100),
     &          jre(0:100),jim(0:100),errorRe,errorIm
        real    v(0:64,0:64),minc
        complex ahat(0:100), jj1(0:100),r(0:100),z,y
        character decision*12
        character equalizer*12
        integer L,Lp,Nb,Lb,Ts,ratio
        character info*12
        character metric*12 common /IM1/L,Lp,Nb,Lb,Ts,ratio
        common /INPUT/jj1,ahat
        common /IM5/M,log2M
        common /VM2/numberVA,Npp
        common /DELAY/N,k
        common /ANSW/decision
        common /VITINT/nm,t
        common /VITI/ind
        common /VIR/v
        common /SYMBOL/jjRe,jjIm
        common /EQU/equalizer
        common /IM9/r,z
        common /OUTPUT/y
        common /NUM/numberBU
        common /INF/info
        common /MET/metric
        common /flags/flag
```

```
          index1=min0(numberVA,t)
C         print*,'INDEX1',index1
          mino=100000000.
          do 80 iiiRe=0,nm-1
          do 80 iiiIm=0,nm-1
             if(mino.gt.v(iiiRe,iiiIm))then
                mino=v(iiiRe,iiiIm)
                hhhRe=iiiRe
                hhhIm=iiiIm
             endif
80        continue 111       index1=min0(numberVA,t)
C         print*,'minimum,iiiRe,iiiIm',mino,ind(index1,hhhRe,hhhIm)
C         print*,'INDEX=',index1
          iiiRe=hhhRe
          iiiIm=hhhIm
          do 90 k=index1,1,-1
             ifRe=real(ind(k,iiiRe,iiiIm))
             ifIm=aimag(ind(k,iiiRe,iiiIm))

iiiRe=(iiiRe/M)+(nm/M)*ifRe
             iiiIm=(iiiIm/M)+(nm/M)*ifIm iiRe=iiiRe-M*(iiiRe/M)
             iiIm=iiiIm-M*(iiiIm/M)

kk=index1-k
             jre(kk)=(M-1)-2*iiRe
             jjm(kk)=(M-1)-2*iiIm

C            print*,jre(kk),jjRe(k+Nkk-Npp),'          Re',t
C            print*,jim(kk),jjIm(k+Nkk-Npp),'          Im',t if(t.gt.numberBU.and.info.ne.'auto'.and.
     &          jre(kk).ne.jjRe(k+Nkk-Npp))errorRe=errorRe+1
             if(t.gt.numberBU.and.info.ne.'auto'.and.
     &          jim(kk).ne.jjIm(k+Nkk-Npp))errorIm=errorIm+1
C            if(t.gt.numberBU)print*,jre(kk),jjRe(k+Nkk-Npp),'***   Re',t
C            if(t.gt.numberBU)print*,jim(kk),jjIm(k+Nkk-Npp),'***   Im',t
90        continue 112       if(t.le.numberBU.and.t.gt.numberVA)then
             if(jre(numberVA-1).ne.jjRe(Nkk-Npp+1))errorRe=errorRe+1
C            print*,'***Re',jre(numberVA-1),jjRe(Nkk-Npp+1),t
             if(jim(numberVA-1).ne.jjIm(Nkk-Npp+1))errorIm=errorIm+1
C            print*,'***Im',jim(numberVA-1),jjIm(Nkk-Npp+1),t
          endif if(equalizer.eq.'withouteq')return C************* DESIRED SIGNAL **********************
          if(decision.eq.'ideal')then
             call ideal
          else
             index2=min0(L+NUMB,t-1)
             do 18 i=0,index2
                ahat(i)=cmplx(jre(i),jim(i))
18           continue endif return
          end
```

Michael
Channel WMF
One 9

Job: channelWMF.f
Date: Fri May 25 13:16:58 1990

```
******************************************************************
*                                                                *
*                   SUBROUTINE channelWMF                        *
*                                                                *
*   Simulates an AWGN channel to used for transmission of the    *
*   signal generated using the conversion filter                 *
*                                                                *
****************************************************************** subroutine channelWMF(kk)
      real var
      complex jj1(0:100),ahat(0:100)
      complex N,z,
     &        rn(0:100),r(0:100),xx(-100:100),
     &        pp(0:100),ff(0:100)
      character filter*12
      character diversity*12
      character info*12
      character shaping*12
      integer cc
      integer L,Lp,Nb,Lb,Ts,ratio
      character MAP*12 common /IM1/L,Lp,Nb,Lb,Ts,ratio
      common /INPUT/jj1,ahat
      common /IM2/var
      common /IM9/r,z
      common /IS9/rn
      common /FILTE/filter
      common /DIVE/diversity
      common /INF/info
      common /XRI/xx
      common /PRI/pp
      common /FRI/ff
      common /REMEM/Nkp
      common /SHP/shaping
      common /NOIN/indexn1,indexn2
      common /MM/MAP save h
      save cc,IFLAG data IFLAG/0/
      data cc/0/
      cc=cc+1
      if(kk.ne.0)return IF(IFLAG.eq.0)THEN
              do 22 i=0,100
                  rn(i)=(0.,0.)
22            continue
              IFLAG=1
          ENDIF C********* SHIFT THE FORWARD PORTION OF THE WMF **************
          do 20 j=Nkp+1,-1
             r(j)=r(j-1)
             rn(j)=rn(j-1)
20        continue C**** CONVOLVE THE IR OF THE CHANNEL WITH THE INPUT SYMBOLS ******
          rn(0)=(0.,0.)
          do 23 j=0,Lp
             rn(0)=rn(0)+jj1(j)*pp(j)
C            print*,j,jj1(j),pp(j)
23        continue C**** ADD WHITE NOISE OF ZERO MEAN AND VARIANCE "var2"
          if(MAP.eq.'FAM')then
             N=cmplx(boxnrm(indexn1),0.)
          elseif(MAP.eq.'QAM')then
             N=cmplx(boxnrm(indexn1),boxnrm(indexn1))
          endif
          rn(0)=rn(0)+var*N r(0)=rn(0)

return
      end
```

```
                                    Job: boxnrm.f
                                    Date: Fri May 25 15:17:32 1990
```

```
C++++++++++++++++++++++++++++++++++++++++++++++++++++++++++++++++++++
C
C      NAME              : BOXNRM(ISTRM) - FUNCTION
C
C      FUNCTION          : SIMULATES NORMALY DISTRIBUTED DEVIATES
C                         ( POLAR METHOD OF BOX & MULLER  IS USED)
C                          REF :  .
C
C      CALLING PROG / SUBPROG :
C
C      CALLED SUBPROG    : URAND
C
C      INPUTS            : ISTRM - PASSED FROM THE CALLING ROUTINE
C
C      OUTPUTS           : STD. NORMALY DISTRIBUTED RANDOM DEVIATES
C
C      PRINCIPAL VARIABLES :
C
C      DATE              : 26 APRIL , 1985.
C
C++++++++++++++++++++++++++++++++++++++++++++++++++++++++++++++++++++
```

```
C
      FUNCTION BOXNRM(ISTRM)
C
C     DECLARATION :
C
      REAL URAND, V1, V2, R, FAC, GSET, BOXNRM
      INTEGER ISTRM, ISET
      SAVE GSET
C
      DATA ISET/0/
C
C     SHOULD WE GENERATE A PAIR OF DEVIATES ?
C
      IF(ISET .EQ. 0) THEN
C
C     YES. WE DON'T HAVE AN EXTRA DEVIATE HANDY, SO PICK
C        TWO UNIFORM NUMBERS IN THE SQUARE EXTENDING FROM
C              -1 TO +1 IN EACH DIRECTION
C
1         V1 = 2. * URAND(ISTRM) - 1.
          V2 = 2. * URAND(ISTRM) - 1.
C
C     SEE IF THEY ARE IN THE UNIT CIRCLE, IF THEY ARE NOT GO TO 1
C
          R = V1**2 + V2**2
          IF( R .GE. 1.) GO TO 1
C
C     NOW MAKE THE BOX-MULLER TRANSFORMATION TO GET TWO NORMAL DEVIATES
C
          FAC = SQRT(-2. * ALOG(R)/R)
C
C     RETURN ONE AND SAVE ONE FOR NEXT TIME
C
          GSET = V1 * FAC
          BOXNRM = V2 * FAC
C
C     SET FLAG
C
          ISET = 1
C
      ELSE
C
C     WE HAVE AN EXTRA DEVIATE HANDY, SO RETURN IT
C
          BOXNRM = GSET
C     UNSET THE FLAG
C
          ISET = 0
C
      ENDIF
C
      RETURN
      END
```

Michael

Urand

Pencil

```
                                    Job:  urand.f
                                    Date: Fri May 25 15:17:53 1990

C        NAME              : URAND(ISTRM) - FUNCTION                    +
C                                                                        +
C        FUNCTION          : GENERATES STANDARD UNIFORMLY DISTRIBUTED    +
C                            RANDOM NUMBERS .                            +
C                          ( USES THE RECURSION:  SEED(ISTRM) =          +
C                                16807 * SEED(ISTRM) MOD (2**(31) - 1) ) +
C                            SOME COMPILERS REQUIRE THE DECLARATION:     +
C                            INTEGER*4 ISTRM, K1                         +
C                            REF :                                       +
C                                                                        +
C        CALLING PROG / SUBPROG :                                        +
C                                                                        +
C        CALLED SUBPROG    : NIL                                         +
C                                                                        +
C        INPUTS            : ISTRM - THE STREAM NUMBER                   +
C                            0 ( SEED(ISTRM) ( 2147483647                +
C                                                                        +
C        OUTPUTS           : STD. UNIFORMLY DISTRIBUTED RANDOM NUMBERS   +
C                            NEW VALUE OF SEED(ISTRM)                    +
C                                                                        +
C        PRINCIPAL VARIABLES :                                           +
C                                                                        +
C        DATE              : 26 APRIL , 1985.                            +
C                                                                        +
C+++++++++++++++++++++++++++++++++++++++++++++++++++++++++++++++++++++++++
C
        FUNCTION URAND(ISTRM)
C
C       DECLARATION :
C
```

```
      INTEGER SIZE3
      PARAMETER(SIZE3 = 24)
      REAL URAND
      INTEGER SEED(SIZE3),ISTRM,ISTRG,K1
C
      save seed
      data seed(1)/456789/
      data seed(2)/1037625857/
      data seed(3)/203999905/
      data seed(4)/1393065417/
      data seed(5)/2111322747/
      data seed(6)/21112248/
      data seed(7)/11322745/
      data seed(8)/513122743/
      data seed(9)/199291999/
      data seed(10)/112747/
      data seed(11)/33132147/
      data seed(12)/392763409/
      data seed(13)/1036253857/
      data seed(14)/203992905/
      data seed(15)/1390695417/
      data seed(16)/2113232747/
      data seed(17)/211222248/
      data seed(18)/11327405/
      data seed(19)/51322743/
      data seed(20)/1999199/
      data seed(21)/11002747/
      data seed(22)/33183247/
C
C     GENERATE A U(0,1) VARIATE
C
      ISTRG = ISTRM
      K1 = SEED(ISTRG)/127773
      SEED(ISTRG) = 16807 * ( SEED(ISTRG) - K1 * 127773) - K1 * 2836
      IF( SEED(ISTRG) .LT. 0) SEED(ISTRG) = SEED(ISTRG) + 2147483647

URAND = FLOAT(SEED(ISTRG)) * 4.656612875E-10
C
      RETURN
      END
```

Job: metricWMF.f
Date: Fri May 25 15:18:30 1990

```
C**********************************************************************
C*                                                                    *
C*                    subroutine metricWMF(t4Re)                      *
C*                                                                    *
C*    "t4Re" is a metric needed in the Viterbi Algorithm which depends*
C*           on the present symbol and on L-1 previous symbols        *
C*                                                                    *
C********************************************************************** subroutine metricWMF(t4Re)
      integer ii(20)
      real    t4Re(0:4096)
      integer L,Lp,Nb,Lb,Ts,ratio
      complex ppp(0:100),p(0:100),f(0:100)
      character equalizer*12 common /IM1/L,Lp,Nb,Lb,Ts,ratio
      common /IM5/M,log2M
      common /IM8/f,p
      common /PPRI/ppp
      common /EQU/equalizer
      save IFLAG
      data IFLAG/0/

IF(equalizer.ne.'adpatequ')then
      IF(IFLAG.eq.1)return
      IFLAG=1
      j1=M-1
      j2=0
      j3=0
      j4=0
      j5=0
      j6=0
      j7=0
      j8=0
      j9=0
      if(L.ge.1)j2=M-1
      if(L.ge.2)j3=M-1
      if(L.ge.3)j4=M-1
      if(L.ge.4)j5=M-1
      if(L.ge.5)j6=M-1
      if(L.ge.6)j7=M-1
      if(L.ge.7)j8=M-1
      if(L.ge.8)j9=M-1 do 20 i1=0,j1
       do 20 i2=0,j2
       do 20 i3=0,j3
       do 20 i4=0,j4
       do 20 i5=0,j5
       do 20 i6=0,j6
       do 20 i7=0,j7
       do 20 i8=0,j8
       do 20 i9=0,j9
         i=1+i1+M*(i2+M*(i3+M*(i4+M*(i5+M*(i6+M*(i7+M*(i8+M*(i9)))))))) 
             ii(1)=(M-1)-2*i1
             ii(2)=(M-1)-2*i2
             ii(3)=(M-1)-2*i3
             ii(4)=(M-1)-2*i4
             ii(5)=(M-1)-2*i5
             ii(6)=(M-1)-2*i6
             ii(7)=(M-1)-2*i7
             ii(8)=(M-1)-2*i8
             ii(9)=(M-1)-2*i9 t4Re(i)=0.
          do 20 k=1,L+1
             t4Re(i)=t4Re(i)+ii(k)*real(ppp(k-1))
C            print*,i,t4Re(i),ii(k),real(ppp(k-1))
20     continue
       ENDIF IF(equalizer.eq.'adaptequ')then
       j1=M-1
       j2=0
       j3=0
       j4=0
       j5=0
```

```
        j6=0
        j7=0
        j8=0
        j9=0
        if(L.ge.1)j2=M-1
        if(L.ge.2)j3=M-1
        if(L.ge.3)j4=M-1
        if(L.ge.4)j5=M-1
        if(L.ge.5)j6=M-1
        if(L.ge.6)j7=M-1
        if(L.ge.7)j8=M-1
        if(L.ge.8)j9=M-1 do 40 i1=0,j1
        do 40 i2=0,j2
        do 40 i3=0,j3
        do 40 i4=0,j4
        do 40 i5=0,j5
        do 40 i6=0,j6
        do 40 i7=0,j7
        do 40 i8=0,j8
        do 40 i9=0,j9
            i=1+i1+M*(i2+M*(i3+M*(i4+M*(i5+M*(i6+M*(i7+M*(i8+M*(i9))))))))
            ii(1)=(M-1)-2*i1
            ii(2)=(M-1)-2*i2
            ii(3)=(M-1)-2*i3
            ii(4)=(M-1)-2*i4
            ii(5)=(M-1)-2*i5
            ii(6)=(M-1)-2*i6
            ii(7)=(M-1)-2*i7
            ii(8)=(M-1)-2*i8
            ii(9)=(M-1)-2*i9 t4Re(i)=ii(1)
            do 40 k=2,L+1
                t4Re(i)=t4Re(i)+ii(k)*real(p(k-1))
40      continue
        ENDIF return
        end
```

Michel metricWMF ending

Job: metricWMFQ.f
Date: Fri May 25 15:19:01 1990

```
C*********************************************************************
*                                                                     *
*                     subroutine metricWMF(t4Re)                      *
*                                                                     *
*    "t4Re" is a metric needed in the Viterbi Algorithm which depends *
*            on the present symbol and on L-1 previous symbols        *
*                                                                     *
*                                                                     *
C********************************************************************* subroutine metricWMFQ(t4)
      complex ii(20)
      complex t4(0:128,0:128)
      integer L,Lp,Nb,Lb,Ts,ratio
       complex ppp(0:100),p(0:100),f(0:100)
      character equalizer*12 common /IM1/L,Lp,Nb,Lb,Ts,ratio
      common /IM5/M,log2M
      common /IM8/f,p
      common /PPRI/ppp
      common /EQU/equalizer
      save IFLAG
      data IFLAG/0/

IF(IFLAG.eq.1)return
      IFLAG=1
      j1=M-1
      j2=0
      j3=0
      j4=0
      j5=0
      if(L.ge.1)j2=M-1
      if(L.ge.2)j3=M-1
      if(L.ge.3)j4=M-1
      if(L.ge.4)j5=M-1 do 21 i1Re=0,j1
        do 21 i2Re=0,j2
        do 21 i3Re=0,j3
        do 21 i4Re=0,j4
        do 21 i5Re=0,j5 do 21 i1Im=0,j1
        do 21 i2Im=0,j2
        do 21 i3Im=0,j3
        do 21 i4Im=0,j4
        do 21 i5Im=0,j5 iRe=1+i1Re
     &    +M*(i2Re
     &    +M*(i3Re
     &    +M*(i4Re
     &    +M*(i5Re))))

iIm=1+i1Im
     &    +M*(i2Im
     &    +M*(i3Im
     &    +M*(i4Im
     &    +M*(i5Im))))

ii(1)=cmplx((M-1)-2*i1Re,(M-1)-2*i1Im)
          ii(2)=cmplx((M-1)-2*i2Re,(M-1)-2*i2Im)
          ii(3)=cmplx((M-1)-2*i3Re,(M-1)-2*i3Im)
          ii(4)=cmplx((M-1)-2*i4Re,(M-1)-2*i4Im)

ii(5)=cmplx((M-1)-2*i5Re,(M-1)-2*i5Im)

t4(iRe,iIm)=0.
          do 20 k=1,L+1
          t4(iRe,iIm)=t4(iRe,iIm)+ii(k)*ppp(k-1)
20        continue
C         print*,iRe,iIm,t4(iRe,iIm),ii(k),ppp(k-1)
21      continue return
        end
```

I claim:

1. Apparatus for transmitting a digital signal over a communications channel, the apparatus comprising:
   at least one encoder for converting digital signals into a sequence of symbols having a signalling interval T;
   a conversion filter connected to the encoder, the conversion filter having an impulse response with a spread L having a value between 2 and 9 for filtering the sequence of symbols to generate a signal S, in which S is dependent on the signalling interval T;
   a modulator connected to the conversion filter for modulating the signal S to generate a signal V;
   a bandpass filter connected to the modulator, the bandpass filter having a cut-off frequency $f_{co}$ for filtering the signal V to generate a signal R;
   in which $f_{co}$ and T are chosen so that the product of $f_{co}$ and T is less than or equal to 1 and greater than or equal to 0.182.

2. The apparatus of claim 1 in which the impulse response of the conversion filter is defined as a Gaussian function of time, and has the form:

$$g(t) = (4\pi\sigma^2)^{\frac{1}{4}} e^{-2(\pi\sigma)^2} e^{j2\pi ht/T}$$

in which $\sigma$ is inversely proportional to L.

3. The apparatus of claim 2 in which the encoder is an M-ary mapper followed by a Gray encoder, in which the symbols take only real values, in which the conversion filter has a modulation index h, h being equal to $\frac{1}{4}$, and M, L, the product of T and $\sigma$, and the product of T and $f_{co}$ having values as shown in the rows of the following table:

| M | L | $\sigma T$ | $f_{co}T$ |
|---|---|---|---|
| 2 | 2 | 0.200 | 0.500 |
| 2 | 3 | 0.120 | 0.277 |
| 2 | 4 | 0.090 | 0.208 |
| 2 | 5 | 0.070 | 0.166 |
| 2 | 6 | 0.060 | 0.139 |
| 2 | 7 | 0.050 | 0.116 |
| 2 | 8 | 0.044 | 0.102 |
| 2 | 9 | 0.039 | 0.091 |
| 4 | 2 | 0.200 | 0.500 |
| 4 | 3 | 0.120 | 0.277 |
| 4 | 4 | 0.090 | 0.208 |
| 4 | 5 | 0.070 | 0.166 |

4. The apparatus of claim 2 in which the encoder is an M-ary mapper followed by a Gray encoder, in which the symbols take complex values, in which the conversion filter has a modulation index h, h being equal to $\frac{1}{4}$ and M, L, the product of T and $\sigma$, and the product of T and $f_{co}$ having values as shown in the rows of the following table:

| M | L | $\sigma T$ | $f_{co}T$ |
|---|---|---|---|
| 2 | 2 | 0.200 | 0.500 |
| 2 | 3 | 0.120 | 0.277 |
| 2 | 4 | 0.090 | 0.208 |
| 2 | 5 | 0.070 | 0.166 |
| 4 | 2 | 0.200 | 0.500 |
| 4 | 3 | 0.120 | 0.277 |

5. The apparatus of claim 1 in which the bandpass filter has a nonzero flat response over the frequency range between $f_{max} - f_{co}$ and $f_{max} + f_{co}$.

6. A process for transmitting a digital signal over a communications channel, the process comprising the steps of:
   encoding the digital signals to generate a sequence of symbols having a signalling interval T;
   filtering the sequence of symbols with a conversion filter to generate a signal S, the conversion filter having an impulse response having a spread L having a value between 1 and 9 and a modulation index h;
   generating a real signal V from the signal S using a modulator;
   filtering the signal V with a bandpass filter to generate a signal R, the bandpass filter having a cut-off frequency $f_{co}$;
   in which $f_{co}$ and T are chosen so that the product of $f_{co}$ and T is less than or equal to 1 and greater than or equal to 0.182.

7. The process of claim 6, in which the impulse response of the conversion filter is defined as a Gaussian function of time.

8. The process of claim 6 in which the bandpass filter has a nonzero flat response over the frequency range between $f_{max} - f_{co}$ and $f_{max} + f_{co}$.

9. The process of claim 6 in which the encoder is an M-ary mapper followed by a Gray encoder, in which the symbols take only real values, in which the impulse response of the conversion filter is defined as a Gaussian function of time having the form $g(t) = (4\pi\sigma^2)^{\frac{1}{4}} e^{-2(\pi\sigma)^2} e^{j2\pi ht/T}$ where $\sigma$ is inversely proportional to L, in which the conversion filter has a modulation index h equal to $\frac{1}{4}$ and M, L, the product of T and $\sigma$, and the product of T and $f_{co}$ having values as shown in the rows of the following table:

| M | L | $\sigma T$ | $f_{co}T$ |
|---|---|---|---|
| 2 | 2 | 0.200 | 0.500 |
| 2 | 3 | 0.120 | 0.277 |
| 2 | 4 | 0.090 | 0.208 |
| 2 | 5 | 0.070 | 0.166 |
| 2 | 6 | 0.060 | 0.139 |
| 2 | 7 | 0.050 | 0.116 |
| 2 | 8 | 0.044 | 0.102 |
| 2 | 9 | 0.039 | 0.091 |
| 4 | 2 | 0.200 | 0.500 |
| 4 | 3 | 0.120 | 0.277 |
| 4 | 4 | 0.090 | 0.208 |
| 4 | 5 | 0.070 | 0.166 |

10. The process of claim 6 in which the encoder is an M-ary mapper followed by a Gray encoder, in which the symbols take complex values, in which the impulse response of the conversion filter is defined as a Gaussian function of time having the form $g(t) = (4\pi\sigma^2)^{\frac{1}{4}} e^{-2(\pi\sigma)^2} e^{j2\pi ht/T}$ where $\sigma$ is inversely proportional to L, in which the conversion filter has a modulation index h equal to $\frac{1}{4}$ and M, L, the product of T and $\sigma$, and the product of T and $f_{co}$ having values as shown in the rows of the following table:

| M | L | $\sigma T$ | $f_{co}T$ |
|---|---|---|---|
| 2 | 2 | 0.200 | 0.500 |
| 2 | 3 | 0.120 | 0.277 |
| 2 | 4 | 0.090 | 0.208 |
| 2 | 5 | 0.070 | 0.166 |
| 4 | 2 | 0.200 | 0.500 |
| 4 | 3 | 0.120 | 0.277 |

* * * * *